United States Patent [19]

Jones

[11] Patent Number: 5,090,612

[45] Date of Patent: Feb. 25, 1992

[54] METHOD OF FABRICATING A PRESSURE VESSEL FOR A METAL OXIDE-HYDROGEN BATTERY

[75] Inventor: Kenneth R. Jones, Oconomowoc, Wis.

[73] Assignee: Globe-Union Inc., Milwaukee, Wis.

[21] Appl. No.: 655,555

[22] Filed: Feb. 13, 1991

[51] Int. Cl.⁵ .............................................. B23K 31/02
[52] U.S. Cl. ................................... 228/184; 228/216; 228/250
[58] Field of Search ............... 228/184, 138, 216, 250, 228/255; 219/121.13, 121.63

[56] References Cited

U.S. PATENT DOCUMENTS

| | | | |
|---|---|---|---|
| 1,810,825 | 6/1931 | Furrer | 228/189 |
| 1,980,561 | 11/1934 | Wagner | 228/216 |
| 4,513,906 | 4/1985 | Chang et al. | 228/184 |
| 4,611,830 | 9/1986 | Von Ahrens | 228/250 |
| 4,639,571 | 1/1987 | Lewandowski et al. | 219/121.13 |
| 4,658,110 | 4/1987 | Miller | 219/121.13 |
| 4,957,830 | 9/1990 | Jones | 429/101 |

Primary Examiner—Richard K. Seidel
Assistant Examiner—Chuck Y. Mah
Attorney, Agent, or Firm—Andrus, Sceales, Starke & Sawall

[57] ABSTRACT

A method of fabricating a metal pressure vessel for a metal oxide-hydrogen battery. A straight length of metal having a generally T-shape cross section is formed into circular configuration and the abutting ends of the strip are welded together to form a ring that includes a generally circular body portion and a flange or fin which projects radially outward from the body portion. The welded ring is expnded radially outward to precisely fit the open end of the shell of the vessel and the ring is then assembled with the open ends of the shell and head with the ends of the shell and head abutting the outwardly extending fin of the ring. The ends of the shell and head are then welded to the ring to complete the assembly.

7 Claims, 1 Drawing Sheet

METHOD OF FABRICATING A PRESSURE VESSEL FOR A METAL OXIDE-HYDROGEN BATTERY

BACKGROUND OF THE INVENTION

In a typical metal oxide-hydrogen battery, such as a nickel oxide-hydrogen battery, one or more cell modules are sealed in an outer pressure vessel that contains pressurized hydrogen gas. The pressure vessel is normally formed of a high strength, corrosion resistant metal, such as Inconel, and includes a cylindrical shell with a pair of domed shaped heads welded to the open ends of the shell. It has been the practice in the past to utilize a machined metal weld ring to support the abutting edges of the shell and head during the welding operation. The typical weld ring has a generally T-shaped cross section including an annular body portion and a central radially extending flange.

To weld the head to the shell, the ring is positioned within the opposed open ends of the head and shell with the ends of the head and shell engaged with opposite surfaces of the fins. The abutting edges of the head and shell are then welded to the ring.

The weld ring, as used in the past, has been machined from a block of metal and in some cases the weld ring has also included central radial spokes. The machining of the ring from a metal, such as Inconel, is an extremely expensive procedure.

The shell and heads of the pressure vessel of a metal oxide-hydrogen battery are normally produced by a metal drawing procedure which can result in slight variations in diameter or concentricity.

The weld ring must fit precisely within the open ends of the shell and head of the vessel. If there is any substantial gap between the ring and the end of the shell or head, weld metal may spray into the battery and the sprayed metal can bridge the cells to provide a shorting path. Further, any weld metal which is deposited in the gap between the weld ring and the end of the head or shell can act as a fulcrum when the vessel is under stress due to the high internal pressure of the hydrogen gas and this can result in stressing of the vessel at the fulcrum and possible failure.

Because of the need for a precise fit between the weld ring and the shell and head, it has been the practice to machine the weld ring slightly oversized and then by trial and error further machine the weld ring to fit the head and shell. This procedure is extremely time consuming and costly due to the fact that in many cases the machining has to be done by an outside supplier.

SUMMARY OF THE INVENTION

The invention is directed to an improved method of fabricating a metal pressure vessel for a metal oxide-hydrogen battery and in particular to a method for welding a head to the open end of a shell of the vessel.

In accordance with the invention, a straight length of a metal, such as Inconel, having a generally T-shaped cross section is formed into circular configuration and the abutting ends of the strip are welded together to provide a ring having a generally circular or annular body portion and an outwardly extending fin or flange.

The annular body of the weld ring is formed slightly undersized with respect to the inner diameter of the shell of the vessel. The ring is then expanded outwardly through use of an expanding fixture until the outer diameter of the annular portion of the ring will fit snugly or precisely within the open end of the shell.

The open end of the head is formed with an internal diameter that is slightly undersized with respect to the outer surface of the annular portion of the weld ring and the open end of the head is then expanded radially to a condition where it will fit snugly on the outer diameter of the annular portion of the weld ring.

With the open end of the shell and the open end of the head positioned on the weld ring and the ends of the shell and head engaged with the opposite sides of the central fin or flange, the members are welded together, preferably by electron beam welding or laser welding. The use of electron beam or laser welding provides a minimum heat effected zone adjacent the weld which is important due to the fact that the vessel cannot be heat treated after welding. A subsequent heat treatment would adversely effect or destroy the cell modules sealed within the vessel.

The method of the invention substantially reduces the cost of welding the head to the shell of the pressure vessel of a metal oxide-hydrogen battery.

As a further advantage, the invention enables the weld ring to be "fine tuned" at the site without machining so that the weld ring will fit precisely with both the shell and the head. As no machining is required for "tuning" the members, the production time for the vessel is substantially decreased.

Other objects and advantages will appear in the course of the following description.

DESCRIPTION OF THE DRAWINGS

The drawings illustrate the best mode presently contemplated of carrying out the invention.

In the drawings

DESCRIPTION OF THE ILLUSTRATED EMBODIMENT

Figure 1:
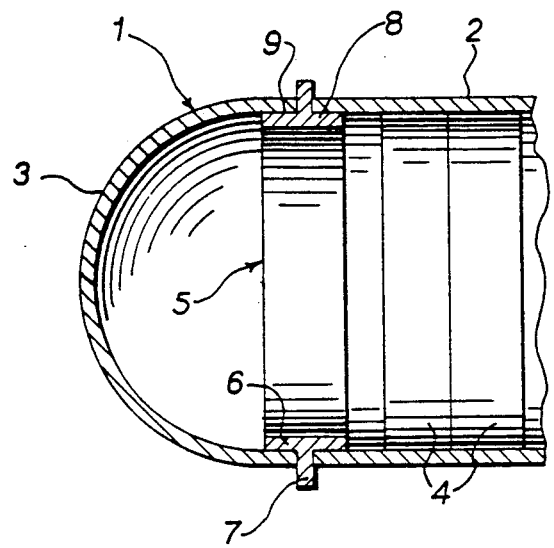
FIG. 1 is a fragmentary longitudinal section of a pressure vessel for a metal oxide-hydrogen battery showing the weld ring assembled with the shell and head.

The drawings illustrate a method of fabricating a metal pressure vessel 1 for a metal oxide-hydrogen battery. The pressure vessel 1 is preferably formed of a high strength, corrosion resistant metal, such as Inconel or stainless steel, and includes a generally cylindrical shell 2, the ends of which are enclosed by domed shaped heads 3, only one of which is shown in FIG. 1.

One or more cell modules 4 are contained within the pressure vessel. The cell modules can be a conventional type and can be constructed as shown in U.S. Pat. No. 4,957,830. In general, each cell modules is composed of a pair of back-to-back positive electrodes spaced apart by a separator layer, along with a pair of negative electrodes, each disposed adjacent and separated from a positive electrode. The positive electrodes can be in the form of flat or sintered metal plaques impregnated with nickel hydroxide, while the negative electrodes can be in the form of fine mesh nickel screen having a catalyst, such as platinum black, bonded to one surface of the screen through a hydrophobic polymeric material. A liquid electrolyte, such as potassium hydroxide, is impregnated into the fiber separators that separate the electrodes. The cell modules can be connected together either in series or parallel relation with the connections extended in sealed relation through the vessel wall to obtain the desired voltage output.

In assembly of the battery, the cell modules 4 are positioned within the shell 2 and the heads 3 are then welded to the open ends of the shell to provide a sealed pressure vessel. As shown in FIG. 1, a weld ring 5 is utilized at the joint between the head and shell. Weld ring 5 includes a generally cylindrical or annular body portion 6 and a central radially extending flange or fin 7. The outer surface of body portion 6 defines a pair of annular surfaces 8 and 9 which are located on either side of the central fin 7. In addition, the outer extremities of the annular surfaces 8 and 9 can be tapered inwardly, as indicated by 10.

Figure 2:
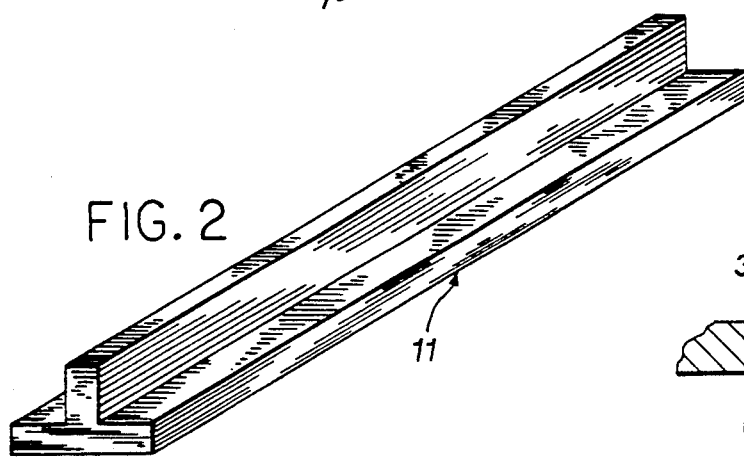
FIG. 2 is a perspective view of a metal strip which is to be formed into a weld ring.

In the process of the invention a straight length or strip 11 of metal is formed with a generally T-shaped configuration as shown in FIG. 2. Metal strip 11 is similar in composition to the metal shell 2, and head 3, and can take the form of Inconel or stainless steel. The T-shape configuration of strip 11 is preferably formed by machining.

Figure 3:
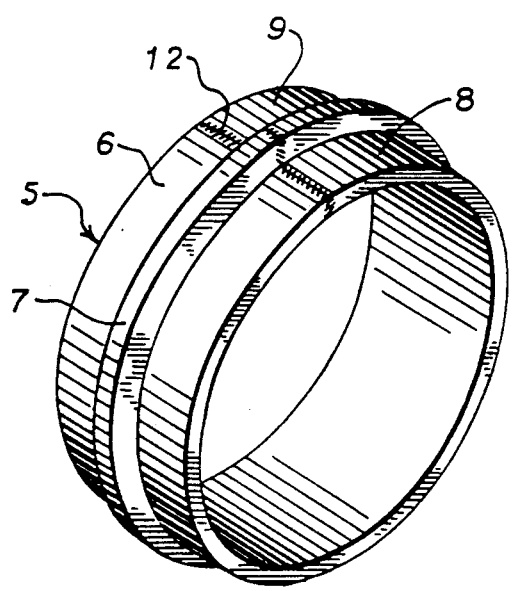
FIG. 3 is a perspective view of the weld ring.

Strip 11 is then formed into a generally circular configuration, as shown in FIG. 3, and the abutting ends of the strip are welded together, as indicated by 12, to form the weld ring 5. An electron beam or laser welding process is preferred as it minimizes spatter. The annular surfaces 8 and 9, as well as the fin 7, can then be machined, if necessary, to eliminate any spatter or burrs.

The outer diameter of surfaces 8 and 9 is formed slightly undersized with respect to the inner diameter of shell 2. After forming of the weld ring 5, and machining if necessary, one of the surfaces 8, is inserted within the open end of the shell and the amount of undersize is determined. The ring is then removed from the shell and expanded radially outward through use of a suitable fixture to provide the surface 8 with a diameter which conforms to the inner diameter of the shell so that the surface 8 will fit snugly within the end of the shell. The fixture employed to expand the ring can be a conventional type including a plurality of radially movable segments which are expanded outwardly by a central wedge- shape die or core.

The inner diameter of head 3, as drawn or formed, is equal to or slightly less than the diameter of surface 9 of the weld ring 5, before expansion of the ring. After expansion of the ring, the inner diameter of the head will be undersized or slightly smaller than the surface 9. The head 3, can then be expanded radially outward through use of the same jig or fixture to provide the head with an internal diameter which will fit snugly on the surface 9.

Figure 4:
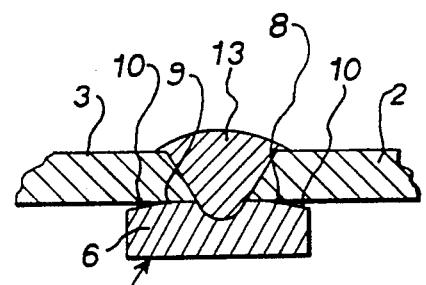
FIG. 4 is an enlarged fragmentary longitudinal section showing the weld between the shell and head.

With the head 3, and shell 2, positioned on the weld ring 5, as shown in FIG. 1, and the ends of the head and shell in engagement with opposite faces of the fin 7, the members are welded together, preferably with electron beam or laser welding, to provide a weld 13 as illustrated in FIG. 4. During welding, a portion of the fin 7 is consumed and serves as part of the finished weld 13.

The use of electron beam or laser welding is important in that it minimizes the heat effected zone adjacent the weld area. After welding of the heads 3 to shell 2, the cell modules are sealed within the pressure vessel and it is not possible to heat treat the welded area without adversely effecting the battery cells.

As the welded vessel is sealed and there is no access to the interior, any weld spatter cannot be removed from the interior of the vessel. The use of electron beam or laser welding is also important in this respect for it minimizes spatter as compared to other welding methods.

The method of the invention substantially reduces the cost of welding the heads to the shell of a pressure vessel for a metal oxide-hydrogen battery by eliminating the necessity of having to machine an annular weld ring as done in the past. Machining of the straight length metal strip 11 can be ready accomplished, and is substantially less expensive then machining a ring from a solid block of metal.

With the invention, the "fine tuning" necessary to provide a precise fit between the weld ring 5 and the head 3, and shell 2, can be accomplished at the assembly site and no axillary machining is required to obtain a proper fit. Not only does this speed up production but also substantially reduces the overall cost of the battery.

Various modes of carrying out the invention are contemplated as being within the scope of the following claims particularly pointing out and distinctly claiming the subject matter which is regarded as the invention.

We claim:

1. A method of attaching a head to a cylindrical shell of a pressure vessel for a metal oxide-hydrogen battery, comprising the steps of forming a straight length of metal with a T-shape cross section, forming the length into a circular configuration and disposing the ends of the length in abutting relation, welding the abutting ends together to form a ring having a pair of outer annular surfaces separated by an outwardly extending radial fin, forming a first of said annular surfaces of said ring with an outer diameter slightly less than the inner diameter of the open end of said shell, expanding the first annular surface radially outward to provide said first annular surface with an outer diameter approximating the inner diameter of the open end of the shell, positioning said first annular surface in the open end of said shell and positioning the end of the shell against one side of said fin, positioning a second of said annular surfaces in the open end of the head and positioning the end of the head against the opposite side of said fin, and welding said ends to said fin.

2. The method of claim 1, wherein the step of welding is selected from the group consisting of electron beam welding and laser welding.

3. The method of claim 1, and including the step of forming the open end of said head with a slightly smaller internal diameter then the internal diameter of the open end of said shell.

4. The method of claim 3, and including the step of expanding the open end of said head radially outward to provide the open end of said head with an internal diameter approximating the outer diameter of said second annular surface before inserting said second annular surface in the end of said head.

5. The method of attaching a head to a cylindrical shell of a pressure vessel for a metal oxide-hydrogen, battery, comprising the steps of forming a strip of metal with a generally T-shaped configuration, forming the strip into a circular configuration and disposing the ends of the strip in abutting relation, welding the abutting ends together to form a ring having a pair of outer annular surfaces separated by a radially extending fin and forming said outer annular surfaces with a diameter less than the inner diameter of an open end of a cylindrical metal shell, expanding said annular surfaces radially outward to provide the annular surfaces with a diameter substantially equal to the inner diameter of said open end of the shell, disposing a first of said annular surfaces in the open end of said shell and positioning the end of the shell against one side of said fin, disposing a second of said annular surface in the open end of a dome shaped head and positioning the end of said head against the opposite side of said fin, and welding said fin to the end of said shell and to the end of said head.

6. The method of claim 5, and including the step of tapering the longitudinal extremity of each annular surface before inserting the annular surface in the respective end of the shell and head.

7. The method of claim 5, and including the step of expanding the open end of said head radially outward to provide the open end of said head with a diameter substantially equal to the diameter of said second annular surface before positioning said second annular surface in the open end of said head.

* * * * *